United States Patent [19]
Montgomery

[11] 3,959,910
[45] June 1, 1976

[54] FISHING SIGNAL DEVICE

[75] Inventor: Theodore Montgomery, Frankfort, S. Dak.

[73] Assignee: Wayne T. Wise, Frankfort, S. Dak.; a part interest

[22] Filed: Mar. 24, 1975

[21] Appl. No.: 561,549

[52] U.S. Cl. .................................................. 43/17
[51] Int. Cl.² .......................................... A01K 97/12
[58] Field of Search .................................... 43/17

[56] References Cited
UNITED STATES PATENTS

| | | | |
|---|---|---|---|
| 2,574,333 | 11/1951 | Kuczynski et al. | 43/17 |
| 2,755,590 | 7/1956 | Collins | 43/17 |
| 2,925,682 | 2/1960 | Kravitch | 43/17 X |
| 3,188,767 | 6/1965 | Finefield | 43/17 |
| 3,228,135 | 1/1966 | Kricksfeld et al. | 43/17 |
| 3,599,368 | 8/1971 | Riley | 43/17 |
| 3,878,635 | 4/1975 | Trosper et al. | 43/17 |

Primary Examiner—Louis G. Mancene
Assistant Examiner—Daniel J. Leach
Attorney, Agent, or Firm—Merchant, Gould, Smith, Edell, Welter & Schmidt

[57] ABSTRACT

A fisherman's accessory which is readily and removably attached to rods of different sizes, and in which a drum switch of special design completes a circuit to electrical signal means when the line is taken by a fish. The arrangement includes means for varying the resistance offered by the device before a signal is given.

7 Claims, 12 Drawing Figures

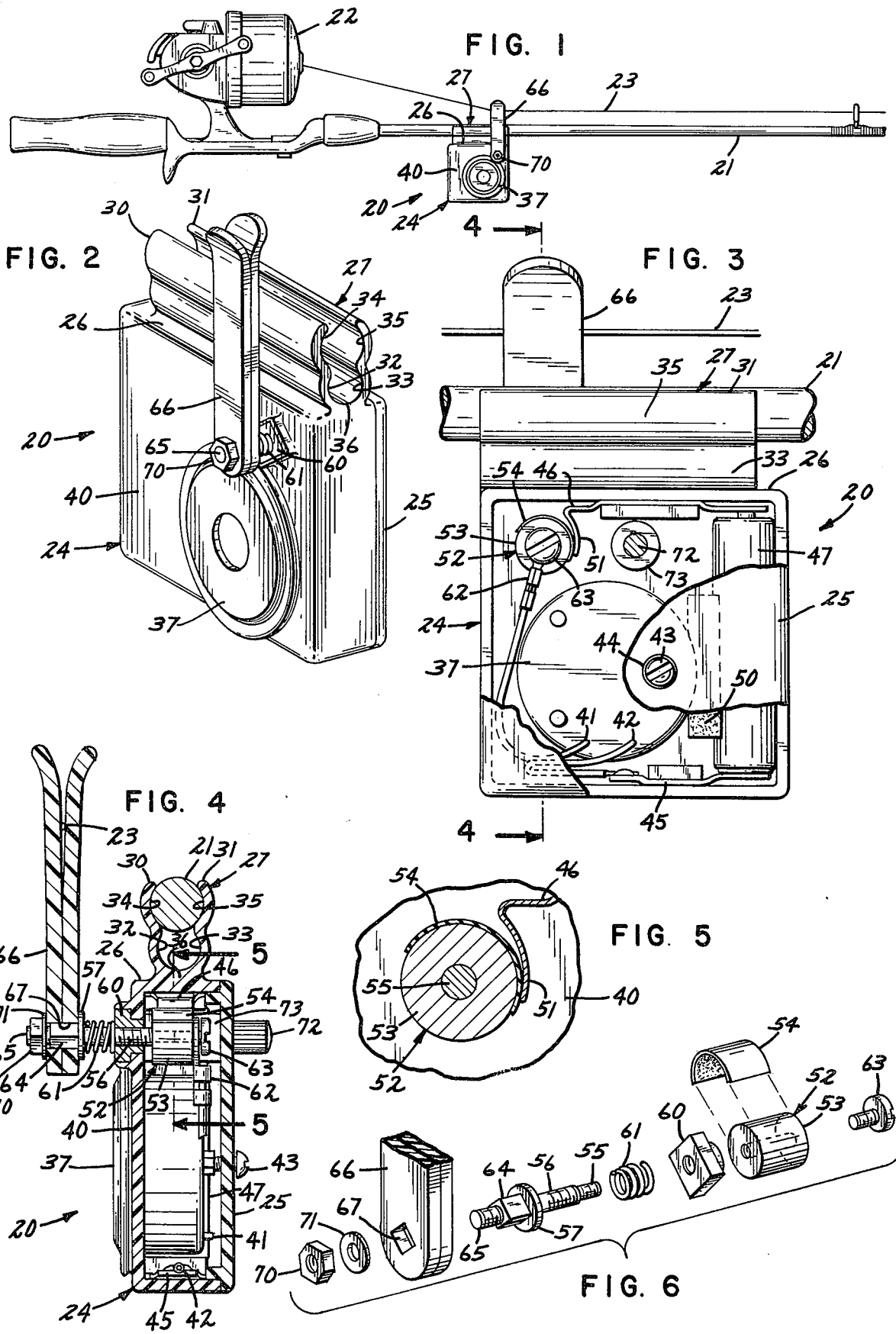

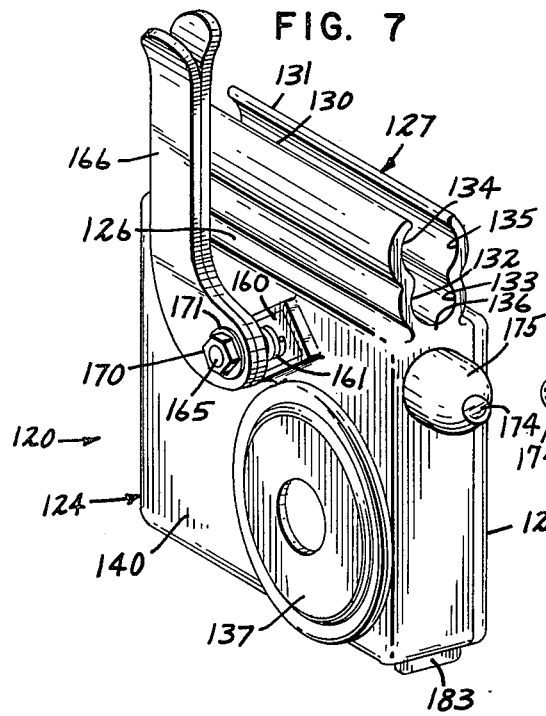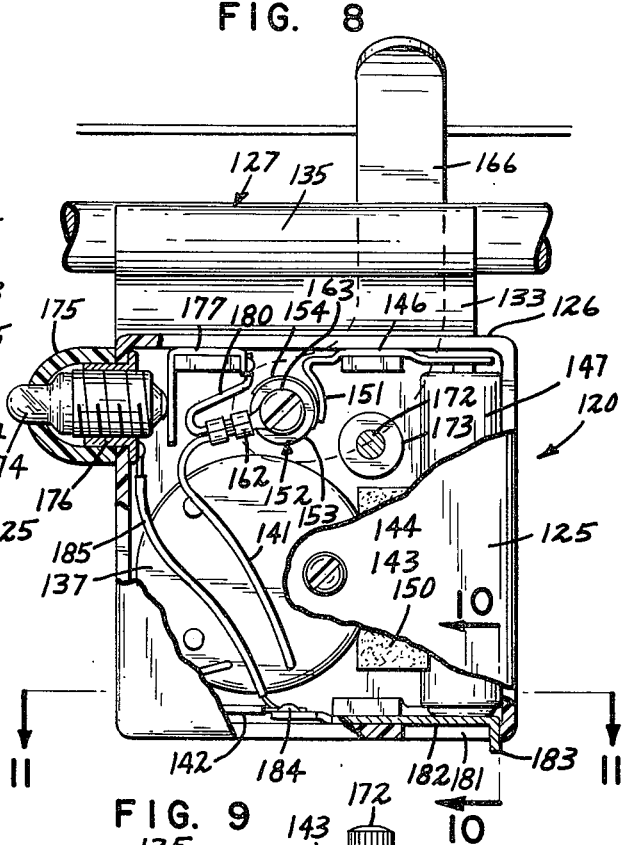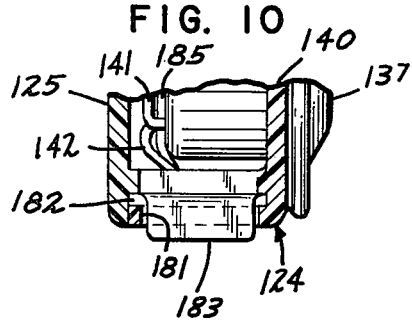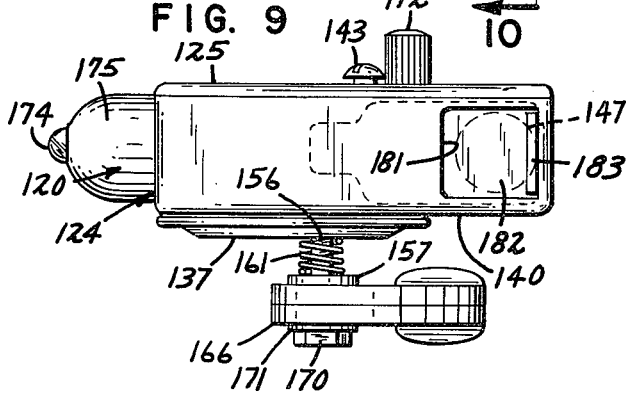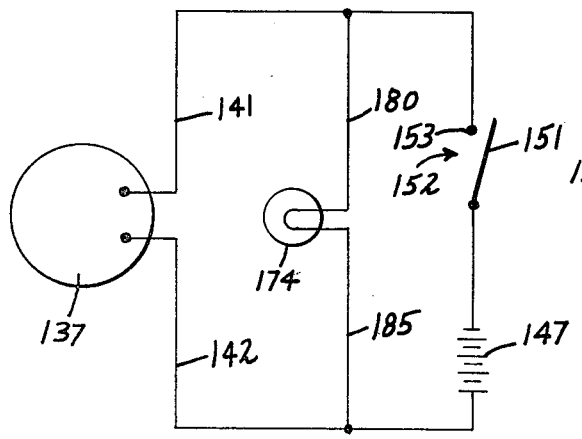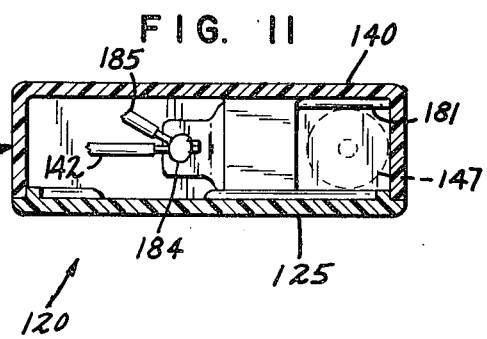

FISHING SIGNAL DEVICE

BACKGROUND OF THE INVENTION

This invention relates to the field of fisherman's accessories, and specifically to apparatus for calling the attention of an angler to the fact that his belt has been taken.

There are many anglers to whom their sport is a matter of relaxation amid peaceful surroundings, and the need to concentrate at all times on the rod and line is a deleterious rather than a beneficial factor in their activities. There are also occasions when any fisherman finds it desirable to leave his line not directly attended; perhaps he wishes to eat a sandwich, or to place his pole in a holder in his boat. Moreover, under some conditions, a fisherman may be permitted to be using more than one line. In all these cases, it is still the intention to catch any fish that presents itself, by techinques known to the angler and appropriate to the conditions and the nature of the fish being sought. This invention comprises means removably mountable on any fishing rod for calling the attention of the angler to the fact that a fish has taken the bait, so that appropriate action may be taken to avoid loss of the fish.

Devices of this general sort are known, but suffer from a number of imperfections. They may, for example, be so heavy as to require mounting on a rod holder rather than the rod itself, or if designed for rod mounting they may be complex and of a number of parts so that mounting and demounting is not a convenient matter. They are often designed so that the line must at all times pass through some component and remain there during the entire landing procedure. They may be electrical or nonelectrial and if electrical, may involve complexity or expense in wiring. They may, for example, be bulky or fragile.

SUMMARY OF THE INVENTION

My invention comprises a compact, light, unitary device, attachable to and removable from a rod and line easily and quickly, and moreover, capable of adjustment to offer different degrees of resistance to operation by a line. My structure is simple and foolproof, and moreover is inexpensive as well as sufficiently rugged to be carried without particular protection in an angler's tackle box. It uses a single battery which is replaceable without tools.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawings,

FIG. 1 is a general view of one embodiment of my invention in use;

FIG. 2 is a perspective view showing one face of the device;

FIG. 3 is a view like FIG. 1 to a larger scale of the opposite face of the device, with parts broken away;

FIG. 4 is a sectional view along the line 4—4 of FIG. 3;

FIG. 5 is a sectional detail along the line 5—5 of FIG. 4;

FIG. 6 is an exploded view of certain components;

FIGS. 7 and 8 are views like FIGS. 2 and 3 of a second embodiment of the invention;

FIG. 9 is a bottom view of the device of FIG. 8;

FIGS. 10 and 11 are sectional views along the lines 10—10 and 11—11 of FIG. 8; and FIG. 12 is a circuit diagram for the second embodiment.

DESCRIPTION OF THE PREFERRED EMBODIMENTS

FIG. 1 shows my invention 20 in use with an angler's rod 21, reel 22, and line 23, and its construction is given in detail in FIGS. 2–6. A housing 24 is shown to cooperate with a cover 25, and to be provided along one edge 26 with means 27 for removably attaching the device to fishing rods of different diameters. Means 27 comprises a pair of resilient members 30 and 31, including first cylindrical concavities 32 and 33 of smaller radius of curvature and second cylindrical concavities 34 and 35 of larger radius of curvature, the axes of the cylinders being substantially parallel and the second concavities being remote from the housing 24 while the first concavities merge with it at 36. As shown in FIG. 3, a rod 21 of large diameter is securely gripped between concavities 34 and 35: a smaller rod would be gripped between concavities 32 and 33.

An electrical signal means in the form of a buzzer 37 is mounted in a hole or otherwise secured to one face 40 of housing 24. Buzzer 37 is provided with a pair of flexible leads 41 and 42, and has an adjustment screw 43 to regulate its operation and pitch which may be accessible through an opening 44 in cover 25. Lead 42 is connected to a first contact 45 fixed in housing 24, and a second fixed contact 46 is also provided. Fixed contacts 45 and 46 are resilient and are arranged to make connection with the cathode and anode respectively of a single cell battery 47 which may be held in place by a resilient pad 50 secured to buzzer 37.

One end of fixed contact 46 is extended at 51 to provide a resilient fixed contact for a drum switch 52 which includes a drum 53 of electrically conductive material having an insulative overlay 54 covering a portion of its periphery. Drum 53 is fixed on one end 55 (FIG. 6) of a threaded shaft 56 extending from an enlargement 57 and in threaded engagement with a bushing 60 carried in face 40 of housing 24. A compression spring 61 is carried on shaft 56 between enlargement 57 and bushing 60, on which it bears respectively at its two ends. Lead 41 is provided with a lug 62 by which it is maintained in electrical connection with the end of drum 53 using a machine screw 63. Contact 51 remains in engagement with drum 53 or overlay 54 as the drum rotates about the axis of shaft 56, there being definite positions in each rotation of the drum at which its electrical connection with contact 51 is made and broken.

Shaft 56 outwardly of enlargement 57 has a first, squared portion 64 followed by a threaded portion 65. A bifurcated crank arm 66 having a square shaped aperture 67 is secured on squared portion 64 by nut 70 and washer 71 carried on threaded portion 65. By this arrangement it is clear that neither crank arm 66 nor drum 53 is free to rotate with respect to shaft 55, but that the latter moves axially as it is rotated in bushing 60 by reason of its threaded engagement therewith; lug 62 is loosely enough held by screw 63 to permit rotation of drum 53 past the lug while retaining electrical connection therebetween, and the housing is thick enough to permit the necessary axial movement of drum 53.

Cover 25 may be secured to housing 24 by means such as a thumb screw 72 engaging in a boss 73 in the housing.

When my device is to be used, cover 25 is removed and battery 47 is inserted to engage contacts 45 and 46: the cover is then replaced. In use, the device is simply clipped to a fishing rod near the reel. Drum 53 was so positioned on shaft 56 relative to square 64 that when crank arm 66 extends upwardly as seen in FIG. 1, contact 51 engages overlay 54. The line is cast and when the fisherman is satisfied that conditions are suitable for him to relax his attention, he simply passes the line between the bifurcations of the crank arm, where it is held frictionally. Now any forceful movement of line 23 to the right as seen in FIG. 1 pulls the line from the crank arm, but rotates the latter in a clockwise direction as it does so. This rotates shaft 55, which in turn rotates drum 53 to a position where contact 51 engages drum 53, completing a circuit from the battery to the buzzer and thus attracting the angler's attention.

It will be evident that the opposition to rotation of shaft 55 in bushing 60 is augmented by endwise friction between spring 61 and enlargement 57 or bushing 60. In my device, this friction may be set at numerous values. The signalling position of the drum is that at which contact 51 just moves off overlay 54 to engage drum 53, and this occurs once in each rotation of shaft 55. The space between members 57 and 60, and the amount of displacement available by compressing spring 51, are correlated with the pitch of the thread engaging shaft 56 in bushing 60 so that several full turns of shaft 56 are available, with several accompanying degrees of added friction being also available at the choice of the user.

The embodiment of the invention shown in FIGS. 7–12 differs from that described above in a number of respects. Where elements are the same, they have been given the same reference numerals increased by 100, and the description in words will not be repeated. The shape of crank arm 166, and the location of drum switch 152, have been changed to provide space in one corner of housing 124 for the socket of a signal lamp 174 enclosed in a protective transparent shield 175. The lamp socket includes a shell 176 and a bracket 177 carried by housing 124 and connected by conductor 180 to lug 162.

A rectangular orifice 181 is formed in the bottom of housing 124. A metallic member 182 for engaging the cathode of battery 147 is arranged to slide in the bottom of the housing, and has an outward lip 183 for manual manipulation. Member 182 is connected to lead 142 of buzzer 137 as at 184 and by a flexible conductor 185 to socket shell 176.

The simple circuit for this device is shown in FIG. 12, where it is seen that buzzer 137 and lamp 174 are connected in parallel to form part of a series circuit including battery 147 and drum switch 152.

The use of this embodiment of the invention is quite clear, and is generally like that of the embodiment first described. A lamp is screwed into socket shell 176 and covered with protector 175. Member 182 is slid aside, a battery 147 is inserted so that the anode engages contact 146, and member 182 is slid into place, closing the opening 181 and completing the connection to battery 147. Now when switch 152 is operated, by action of a fish line on crank 166, buzzer 137 and lamp 174 are both energized.

It is to be realized that the operativeness of either embodiment of the invention can be tested at any time simply by moving crank arm 66 or 166 to close drum switch 52 or 152, and an alarm once given can be interrupted by turning the crank arm to open the drum switch.

From the above, it will be apparent that I have invented a new angler's accessory which is light, inexpensive, rugged, easily portable, easily applied to line and rod, and adjustable in tension, and which gives audible and visual indication that an unattended line requires attention.

Numerous characteristics and advantages of my invention have been set forth in the foregoing description, together with details of the structure and function of the invention, and the novel features thereof are pointed out in the appended claims. This disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A fisherman's accessory comprising, in combination:

a housing;

means for removably mounting said housing on cylindrical members of different diameters, including a pair of spaced, resilient arms having pairs of aligned, cylindrical concavities with different radii of curvature and parallel axes;

a threaded bore in said housing extending orthogonally to the axes of said concavities;

a shaft threadedly engaging said bore in said housing, so that rotation of said shaft causes axial movement thereof;

a drum fixed to said shaft within said housing, having a cylindrical surface of which a first peripheral portion is electrically conductive and a second peripheral portion is electrically non-conductive;

electrically conductive contact means carried by said housing for engaging said surface;

a source of electrical energy, electrical signal means, and means completing a series electrical circuit including said source, said signal means, said contact means, and the electrically conductive surface of said drum, so that when the latter rotates to a position in which its electrically conductive surface engages said contact means, the circuit is completed and the signal means is operated;

a crank arm fixed to said shaft outside said housing at a location on said shaft spaced from said housing, so that rotation of said crank arm about the axis of said shaft causes rotation of said shaft and said drum;

compression spring means carried on said shaft between said housing and said crank arm and frictionally engaging the same at its respective ends, so that rotation of said shaft compresses or releases said spring to vary the frictional opposition exerted thereby against rotation of said crank arm;

and releasable line engaging means carried by said crank arm, so that force acting on the line is enabled to cause rotation of said arm.

2. The structure of claim 1 in which said mounting means includes first aligned concavities of smaller radius of curvature near the housing, and second aligned concavities of larger radius of curvature remote from the housing.

3. The structure of claim 1 in which the drum is metallic and a portion of the periphery thereof is overlaid with electrically insulative material, and in which electrical connection is made to said drum at an end thereof.

4. The structure of claim 1 in which the signal means includes a buzzer.

5. The structure of claim 1 in which the signal means includes a lamp.

6. The structure of claim 1 in which the signal means includes a lamp and a buzzer.

7. The method of adjusting the resistance to rotation offered by a shaft which comprises the steps of:
1. passing the shaft through a member fixed against rotation with the shaft and threadedly engaged therewith;
2. mounting a compression spring on the shaft so that one end thereof frictionally engages the fixed member threadedly engaged with said shaft; and
3. fixing a further member to the shaft at a location spaced from the fixed member for rotation with the shaft in frictional engagement with the other end of the spring.

* * * * *